United States Patent [19]
McGlynn et al.

[11] Patent Number: 4,905,282
[45] Date of Patent: Feb. 27, 1990

[54] FEATURE NEGOTIATION PROTOCOL AND DYNAMICALLY ADJUSTABLE RETRAINING SEQUENCE FOR A HIGH SPEED HALF DUPLEX MODEM

[75] Inventors: Paul E. McGlynn, Decatur; Randy D. Nash, Dacula, both of Ga.

[73] Assignee: Hayes Microcomputer Products, Inc., Norgross, Ga.

[21] Appl. No.: 259,882

[22] Filed: Oct. 19, 1988

[51] Int. Cl.$^4$ ............................................. H01B 1/38
[52] U.S. Cl. ...................................... 380/48; 375/13; 375/8
[58] Field of Search .................. 375/13, 8, 15, 39, 121; 380/9, 48

[56] References Cited

U.S. PATENT DOCUMENTS

| | | | |
|---|---|---|---|
| 4,433,425 | 2/1984 | deJaeger | 375/13 |
| 4,489,416 | 12/1984 | Stuart | 375/13 |
| 4,525,847 | 6/1985 | Brymer | 375/39 |
| 4,597,089 | 6/1986 | Motley et al. | 375/13 |
| 4,621,366 | 11/1986 | Cain et al. | 375/8 |
| 4,646,320 | 2/1987 | Krishnan | 375/121 |
| 4,669,090 | 5/1987 | Betts et al. | 375/8 |
| 4,672,630 | 6/1987 | Kaku | 375/13 |
| 4,756,007 | 7/1988 | Qureshi et al. | 375/8 |
| 4,771,438 | 9/1988 | Nash | 375/15 |
| 4,782,498 | 12/1988 | Copeland, III | 375/121 |
| 4,792,940 | 12/1988 | Hiraguchi | 375/13 |

Primary Examiner—Salvatore Cangialosi
Attorney, Agent, or Firm—Jones, Askew & Lunsford

[57] ABSTRACT

A feature negotiation protocol for synchronous operation and a dynamically adjustable retraining sequence. An originating modem, after completing conventional or standard handshaking sequences, sends a list of desired features to an answering modem. The answering modem either concurs with the desired features, if they are all supported, or sends, back to the originating modem, a list of those features which are supported by the answering modem. After the end of a negotiation time-out period, both modems begin operation using the features which are common to both modems or by using default (standard) features for operation. If the adjustable duration retraining sequence is selected then each modem will measure the elapsed time since the end of its last transmission and, at the beginning of its next transmission, send a retraining sequence which is dependent upon this elapsed time. Likewise, each modem will measure the amount of elapsed time since the end of its last reception and expect to receive a retraining sequence which is dependent upon this elapsed time. The adjustable duration retraining sequence generally operates to reduce the total retraining sequence and thereby increases the data throughput rate. The result is a modem which has enhanced feature negotiation capabilities and also a higher data throughput rate.

43 Claims, 4 Drawing Sheets

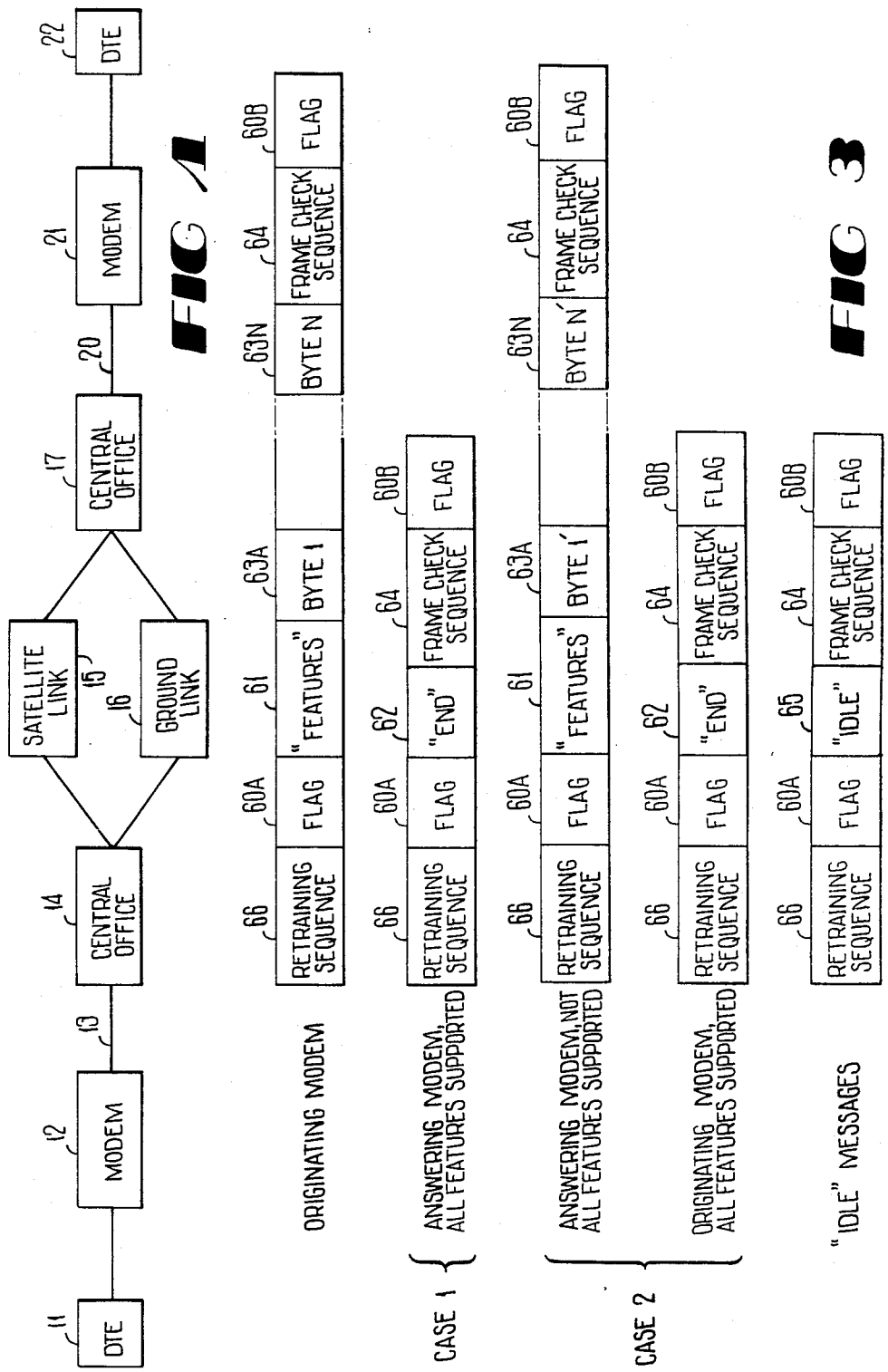

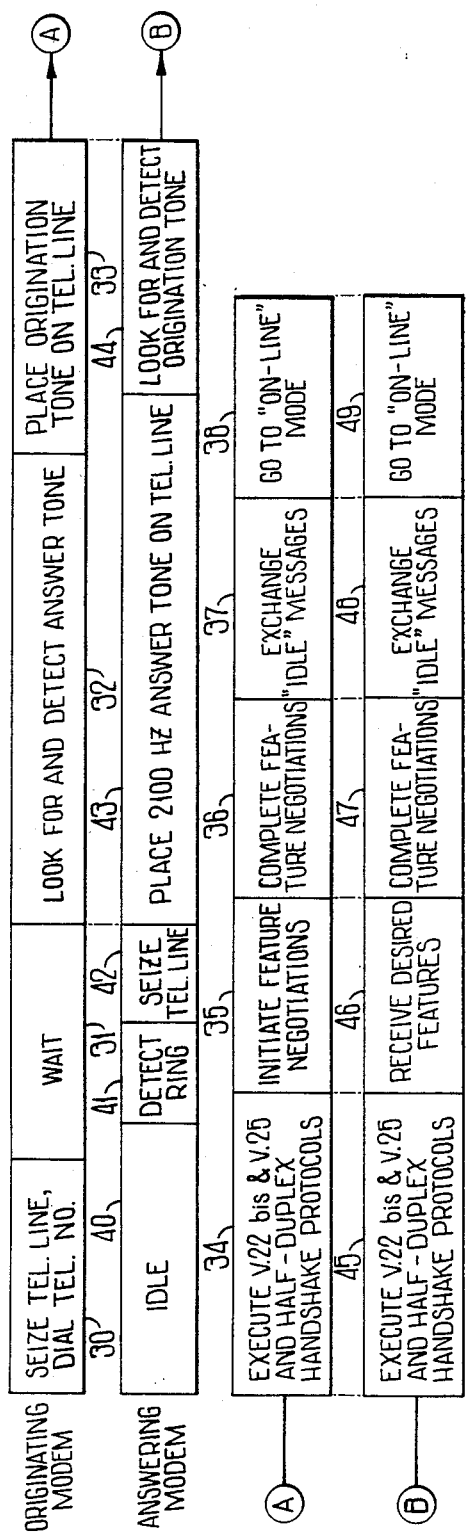

MODEM 12 OR MODEM 21

FEATURE NEGOTIATION PROTOCOL AND DYNAMICALLY ADJUSTABLE RETRAINING SEQUENCE FOR A HIGH SPEED HALF DUPLEX MODEM

TECHNICAL FIELD

The present invention relates to data communications devices and, more particularly, describes a high capacity feature negotiation protocol and a dynamically adjustable retraining sequence for improving the data transfer rate between two modems.

BACKGROUND OF THE INVENTION

In a fully synchronous data transfer system, the interface between the data terminal equipment (DTE) and the data communications equipment (DCE), such as a modem, is synchronous and the interface between the DCE's is also synchronous. In this type of an environment, the modems operate as simple data transfer devices. That is, the DTE's control the direction of the data transfer, are responsible for error detection and control, data compression/decompression, and/or data encryption/decryption. The modems therefore function as "dumb" devices whose sole function is to transfer data between the DTE and the data link (e.g., a telephone line).

In half duplex operation, the modems take turns transmitting. The length of an individual transmission is dependent upon the amount of data that the DTE has to send and any packet size limitation imposed by the protocol being used. Also, in half duplex operation, since only one modem can transmit at a time, then during the period when a first modem is transmitting the receiver for that modem is not receiving a signal from the second modem. As a consequence, the receiver clocks and phase-locked loops for the first modem gradually lose synchronization with the transmitter clocks in the second modem and require resynchronization before data can be successfully transferred. Therefore, at the beginning of each transmission, a retraining sequence is sent. The retraining sequence allows the receiver clocks of one modem to resynchronize to the transmitter clocks of the other modem. This retraining sequence typically has a fixed duration which is sufficient to cause resynchronization for short burst, half duplex operations.

However, the amount of resynchronization actually required is an approximately linear function of the period for which the receiver was receiving no data. Therefore, if the receiver has not received a signal from the other transmitter for a short period, then only a short retraining sequence is necessary to achieve resynchronization. It will be appreciated that prefixing a fixed duration retraining sequence to every transmission can significantly reduce the effective data transfer rate when the data is transferred in short bursts. Likewise, if the receiver has not received a signal from the other transmitter for a long period, then a longer retraining sequence is necessary to achieve resynchronization. It will be appreciated that this fixed duration retraining sequence may be insufficient to achieve resynchronization when there is a long period between line turnarounds. However, existing modems provide only for a fixed length retraining sequence, regardless of the amount of time between transmissions. Therefore, there is a need for a modem which provides a retraining sequence which has a duration dependent upon the period of time that the opposing receiver has not been receiving a signal. Also, there is a need for a modem which expects a retraining sequence which has a duration dependent upon the period of time that the opposing transmitter has not been transmitting a signal.

Furthermore, because of transmission link delays and different clock frequency tolerances, the two modems will not necessarily agree upon the amount of time that a particular receiver has not been receiving a signal. This can cause data loss if the duration of the retraining sequence is insufficient to resynchronize the receiver or if the receiver is still expecting additional retraining even after the opposing transmitter has begun transmitting data. Therefore, there is a need for a modem which provides a retraining sequence which has a duration dependent upon the amount of time since the last transmission and which compensates for delays in the data transmission link (e.g., a telephone line). Likewise, there is a need for a modem which expects a retraining sequence which has a duration dependent upon the amount of time since the last reception and which compensates for delays in the data transmission link.

The provision of an adjustable duration retraining sequence has two effects: higher data transfer rates; and incompatibility with previously existing modems. The first effect is desirable. The second effect is an undesirable consequence. If the modem is to have maximum utility, the modem should provide for both fixed duration and adjustable duration retraining sequences. The modem can then maintain compatibility with existing equipment and also provide a higher data transfer rate when it is communicating with another modem which also has the adjustable duration retraining sequence feature. However, the modem must have a way of determining whether the other modem is a conventional modem or is an improved modem with the adjustable duration retraining sequence feature. Therefore, there is a need for a handshaking protocol which will allow a first modem to determine whether a second, connected modem is of a conventional design or of an improved design.

It is a simple matter to provide for a handshake signal. However, it is substantially more difficult to provide for a handshaking sequence which can be used in conjunction with existing handshaking sequences without disrupting the operation of these existing handshaking sequences. CCITT Recommendation V.22 et al. provide for a handshaking sequence so that a modem can determine whether the modem to which it is connected operates at 300, 1200 or 2400 bps. In addition, U.S. patent application Ser. No. 054,419, filed May 26, 1987, by Tjahjadi et al., entitled "High Speed Half Duplex Modem With Fast Turnaround Protocol" and assigned to the assignee of the present invention, hereby incorporated herein by reference, describes a handshaking sequence which, in addition to maintaining compatibility with the standard 300/1200/2400 bps handshaking sequence, also provides for a selection of 4800 or 9600 bps operation. Therefore, there is a need for an additional handshake sequence which is compatible with existing handshake sequences and further provides an indication that the modem is of an improved type.

There is currently no feature negotiation capability in synchronous modems, so the addition of any new feature requires that a new or modified handshake be provided.

With the expanding number of present and possible enhancements or features that are currently available and/or may become available in the near future, it is desirable to have a handshaking sequence which can provide for negotiation of a plurality of different features between the two modems. The handshaking sequence should accommodate the negotiation of any existing features and also provide for negotiation of additional features which may be provided in the future. Therefore, there is a need for a handshaking sequence which is compatible with existing handshake sequences and also has the capability to allow negotiation of a plurality of features or enhancements.

SUMMARY OF THE INVENTION

The present invention provides a retraining sequence which has a duration which is responsive to the period of time since the last transmission and to delays in the data link (telephone line). The present invention also provides a handshaking sequence which is compatible with existing sequences so that two modems may negotiate whether the adjustable duration retraining sequence feature and/or other features are to be utilized.

More particularly described, the present invention is a modem which measures the time since its last transmission and provides a retraining sequence which has a duration dependent upon this elapsed time.

Also more particularly described, the present invention is a modem which measures the time since its last reception and expects a retraining sequence which has a duration dependent upon this elapsed time.

Also more particularly described, the present invention is a method for providing a retraining sequence having a duration which is dependent upon the time elapsed since the last transmission, including any delay in the data transmission link.

Also more particularly described, the present invention is a handshaking sequence which is compatible with existing handshaking sequences so that an improved modem, which has the capability for providing and using an adjustable duration retraining sequence, can determine whether the modem to which it is connection is also an improved modem or is a conventional modem.

Also more particularly described, the present invention is a method for providing a handshaking sequence which is compatible with existing handshaking sequences and has the capability of negotiating more than one feature so that both existing and future features may be negotiated.

In the present invention, after conventional handshaking is completed, the calling modem, if capable of feature negotiation, sends a list of features that it desires to implement. The answering modem responds with an affirmation if all of the features are available, or a return list of features if only a subset of the requested features are available. If the adjustable duration retraining sequence feature is selected, each modem will measure the period of time since its last transmission and adjust the length of the transmitted retraining sequence accordingly. Likewise, each modem will measure the amount of time since it last received a transmission and adjust the period of time that it expects to receive a retraining sequence. If the periods between transmissions are short then the retraining sequences will also be short. The shorter retraining sequences allows more data to be transferred for a given period of transmission and thereby increases the effective data transfer rate between the modems. Similarly, if the periods between transmissions are longer then the retrainings sequences will also be longer. The longer retraining sequences provide for better resynchronization of the receiver clocks and therefore reduce the probability of data loss at the beginning of a transmission.

Therefore, it is an object of the present invention to provide a handshaking sequence which will allow an improved modem to negotiate the use of nonstandard features with another improved modem while still maintaining compatibility with existing modems.

It is a further object of the present invention to provide for an adjustable duration retraining sequence so that the duration of the retraining sequence is dependent upon the amount of time between transmissions.

It is a further object of the present invention to increase the effective data transfer rate between modems by reducing the duration of the retraining sequence.

It is a further object of the present invention to increase the reliability of a data transmission by, when appropriate, increasing the duration of the retraining sequence so as to provide for better resynchronization of receiver clocks.

BRIEF DESCRIPTION OF THE DRAWING

FIG. 1 is a block diagram of the preferred embodiment of the present invention in its preferred environment.

FIG. 2 is an illustration of the preferred embodiment of the handshaking sequence of the present invention.

FIG. 3 is an illustration of the preferred embodiment of the features negotiation protocol.

DETAILED DESCRIPTION OF THE INVENTION

Figure 4:
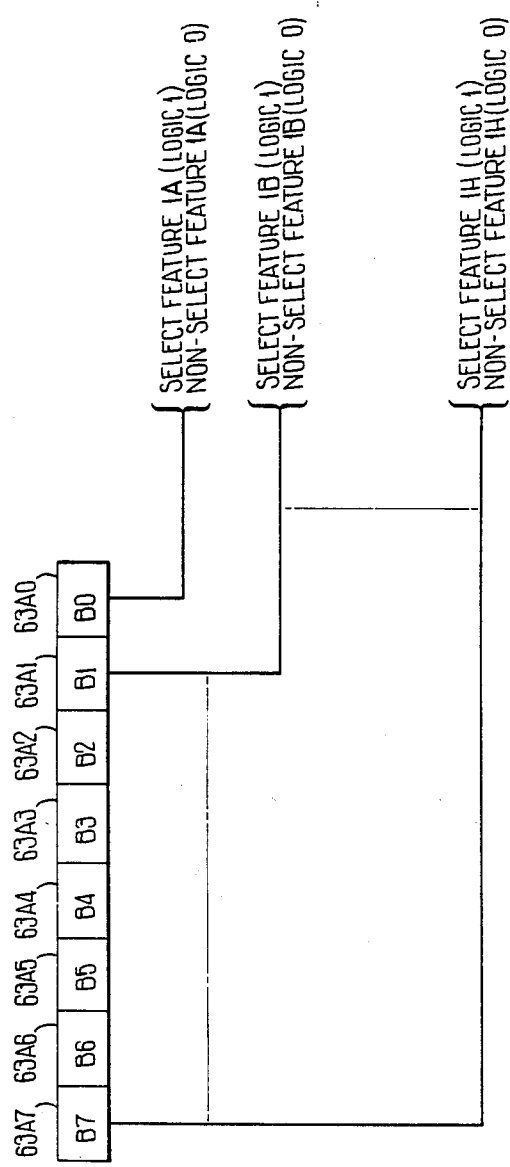
FIG. 4 is an illustration of a typical features byte 63A.

Turn now to the drawing in which like numerals represent like components throughout the several figures. FIG. 1 is a block diagram of the preferred embodiment of the present invention in its preferred environment. Data terminal equipment (DTE) 11 synchronously exchanges data with data communications equipment (DCE), such as a modem 12. Modem 12 converts the data into a form suitable for transmission to a telephone company central office (C.O.) 14 over a telephone line 13. Telephone line 13 may be, for example, an analog telephone line or an ISDN telephone line, may use twisted pair, coaxial, or fiber optic cable, etc. Central office 14 will exchange the data with central office 17 via a ground link 15, such as cables and/or a microwave transmission tower, or a satellite link 16, or a combination of all. Central office 17 exchanges data with modem 21 over a telephone line 20, and modem 21 synchronously exchanges data with DTE 22. Modem 12 is capable of at least two forms of operation: conventional synchronous transfer with a fixed retraining sequence at the beginning of each data transmission; and an improved synchronous data transfer, wherein the duration of the retraining sequence is dependent upon the amount of time since the last transmission. Modem 21 may therefore be either a conventional modem or a modem of the improved type. If modem 21 is of the conventional type, then modem 12 will operate in a standard mode, will transmit a fixed duration retraining sequence at the beginning of each transmission, and will expect to receive a fixed duration retraining sequence at the beginning of each reception. If modem 21 is of the improved type described herein, the modem 12 will operate in an adjustable retraining sequence mode, whereby it will transmit a retraining sequence having a duration dependent upon the amount of time elapsed since its last transmission, and will expect to receive a retraining sequence having a duration dependent upon the amount of time since its last reception.

Assume now that both modems 12 and 21 are of the improved type. Modem 12 will measure the time between the end of its last transmission and the start of the current transmission and provide a retraining sequence which is dependent upon this elapsed time. Modem 21 will measure the time since the end of the last reception and beginning of the current reception and will expect a retraining sequence having a duration dependent upon this elapsed time. Similarly, modem 21 provides an adjustable retraining sequence when it transmits and modem 12 expects an adjustable duration retraining sequence when it receives.

The retraining sequence, whether of a fixed duration or an adjustable duration, is used by the receiving modem to resynchronize its clocks and phase locked loops to the clocks of the transmitting modem. The retraining sequence can also be used to update the adaptive equalizer in the receiving modem.

Table 1 lists the preferred retraining sequence durations for a 4800 bps operation. The pause time for the receiver is the amount of time since it last received a transmission. The pause time for the transmitter is, accordingly, the amount of time since the end of its last transmission. Each modem therefore keeps track of two times: one for its receiver, and one for its transmitter.

TABLE 1

RETRAINING SEQUENCE DURATION FOR 4800 bps OPERATION

| | RECEIVER | | TRANSMITTER | |
|---|---|---|---|---|
| Stage | Maximum Pause (Sec) | Retraining Sequence Duration (mSec) | Maximum Pause (Sec) | Retraining Sequence Duration (mSec) |
| 1 | 0.8 | 90 | 0.2 | 100 |
| 2 | 1.5 | 190 | 0.9 | 200 |
| 3 | 2.0 | 290 | 1.4 | 300 |
| 4 | 5.0 | 990 | 4.4 | 1000 |
| 5 | 10.0 | 2990 | 9.4 | 3000 |
| 6 | >10.0 | 4990 | >9.4 | 5000 |

In order to compensate for telephone delays, the pause time for both transmitter and receiver was 1.5 seconds. If, due to differences in measurements and/or telephone propagation delays, the receiver of one modem measured over 2 seconds while the transmitter for the other modem measured less than 2 seconds the receiver would be expecting a 290 millisecond retraining sequence but the transmitter would only be providing a 200 millisecond retraining sequence. Therefore, at least 90 milliseconds of data would be lost before the receiver would switch from the retraining mode to the data transfer mode. To avoid this problem an offset is built into the table so that, for any given pause time, the retraining time that the receiver expects will always be less than or equal to the retraining time that the transmitter provides. Also, for each stage, the minimum retraining time that the receiver expects is slightly less than the minimum training time that the transmitter will provide. This allows the receiver to miss the very beginning of the retraining transmission but still complete its retraining process prior to the time that the transmitter discontinues the retraining sequence and begins sending data. This also helps to ensure that the receiver does not miss the data message.

The retraining sequence duration versus pause time function is actually a continuous function. However, for convenience in constructing a look-up table, the function was broken into six stages. Of course, a different number of stages could be used but, typically, the first three stages will be used for most communications so additional stages would be of marginal benefit.

Table 2 lists the retraining sequence durations for 9600 bps operation. It will be seen from Table 2 that there are three stages for the transmitter: an unscrambled 4 point sequence; a scrambled 4 point sequence; and a 32 point sequence. There are two stages for the receiver: 4 point sequence reception (whether scrambled or unscrambled); and 32 point sequence reception. As in Table 1, the receiver stage bounds and transmitter stage bounds are offset by 600 milliseconds. Also, except for stages 1 and 2, the total sequence duration that the receiver expects for a given stage number is shorter than the minimum sequence duration that the transmitter will send. This allows the receiver to miss the very beginning of the retraining transmission but still complete its retraining process prior to the time that the transmitter discontinues the retraining sequence and begins sending data. This also helps to ensure that the receiver does not miss the data message.

TABLE 2

RETRAINING SEQUENCE DURATIONS FOR 9600 bps OPERATION

| | RECEIVER | | | | TRANSMITTER | | | |
|---|---|---|---|---|---|---|---|---|
| Stage | Maximum Pause (Sec) | 4 Point Sequence Duration (mSec) | 32 Point Sequence Duration (mSec) | Total Sequence Duration (mSec) | Maximum Pause (Sec) | Minimum Unscrambled 4 Point Sequence Duration (mSec) | Minimum Scrambled 4 Point Sequence Duration (mSec) | Minimum 32 Point Sequence Duration (mSec) | Total Sequence Duration (mSec) |
| 1 | 0.8 | 50 | 30 | 80 | 0.2 | 10 | 50 | 20 | 80 |
| 2 | 1.6 | 110 | 30 | 140 | 1.0 | 10 | 110 | 20 | 140 |
| 3 | 2.4 | 180 | 30 | 210 | 1.8 | 10 | 180 | 20 | 210 |
| 4 | 3.2 | 250 | 120 | 370 | 2.6 | 10 | 250 | 130 | 390 |
| 5 | 4.0 | 340 | 240 | 580 | 3.4 | 10 | 340 | 250 | 600 |
| 6 | 6.0 | 530 | 480 | 1010 | 5.4 | 10 | 530 | 490 | 1030 |
| 7 | 8.0 | 970 | 1550 | 2520 | 7.4 | 10 | 970 | 1560 | 2540 |
| 8 | 10.0 | 2470 | 540 | 3010 | 9.4 | 10 | 2470 | 550 | 3030 |
| 9 | >10.0 | 2970 | 50 | 3020 | >9.4 | 10 | 2970 | 60 | 3040 | transmitter and receiver stages do not change at the same pause time. Assume, for example, that the stage 2

The 10 millisecond unscrambled 4 point sequence aids the receiving modem in beginning to resynchronize its clocks prior to beginning of the reception of the scrambled 4 point sequence. However, the unscrambled 4 point sequence is not absolutely necessary and can, if desired, be eliminated. If the unscrambled 4 point sequence is eliminated then the duration of the scrambled 4 point sequence and/or the duration of the 32 point sequence should be increased by 10 milliseconds, the object being to provide a total duration which is adequate to retrain the clocks and phase locked loops in the receiving modem.

Assume that the time measured by both the receiver for the first modem and the transmitter for the second modem is 0.9 seconds, which corresponds to stage 2. The transmitter will send a 10 millisecond unscrambled 4 point sequence followed by a 110 millisecond scrambled 4 point sequence. The receiver will be looking for 110 milliseconds of a 4 point sequence, whether scrambled or unscrambled. The total transmitter 4 point sequence time will be 120 milliseconds. Therefore, even if the receiver misses the beginning of the retraining sequence, it will switch (at 110 milliseconds) and begin looking for the 32 point sequence. Note that the receiver begins looking for the 32 point sequence at 110 milliseconds and the transmitter begins sending the 32 point sequence at 120 milliseconds. Therefore, the receiver will always begin looking for the 32 point sequence prior to the time that the transmitter will begin sending the 32 point sequence. This assures that, when the transmitter begins sending the 32 point sequence, the receiver is receptive to the 32 point sequence. Again, it will be noticed that, except for the first three stages, the total sequence duration expected by the receiver is less than the minimum total sequence duration sent by the transmitter.

As another example, assume that the right to transmit has just been turned over to the transmitter for the second modem and the second modem has measured 2.0 seconds since the end of its last transmission. The transmitter for the second modem would be in stage 3 and would transmit 10 milliseconds of an unscrambled 4 point sequence, 180 milliseconds of a scrambled 4 point sequence, and 20 milliseconds of a 32 point sequence. If we assume that the telephone delay is a worst case condition of 600 milliseconds then, at the time the transmitter begins sending, the receiver for the first modem will only have detected an elapsed time of 1.4 seconds and would still be in stage 2. However, 200 milliseconds later, while the sequence from the other transmitter is still working its way through the telephone system, the receiver for the first modem will note that 1.6 seconds have elapsed and switch to stage 2. By the time the signal actually arrives at the receiver, the elapsed time will total 2.0 seconds and the receiver will be expecting 110 milliseconds of the 4 point sequence followed by 30 milliseconds of the 32 point sequence. Therefore, the retraining sequence sent by the transmitter is at least as large as the minimum expected retraining sequence duration expected by the receiver. Note that, for any given pause time, the sequence duration that the receiver expects will always be less than or equal to the sequence duration that the transmitter is sending.

Turn now to FIG. 2 which is an illustration of the preferred embodiment of the handshaking sequence of the present invention. It will be appreciated that, if the adjustable start-up sequence duration is to be useful, both modems must use or not use that sequence. Therefore, one modem must have a way of determining whether the other modem can accommodate the adjustable retraining sequence duration. In the preferred embodiment, after completion of standard handshaking sequences, the originating modem initiates feature negotiation by sending a listing of desired or supported features. If the answering modem is capable of feature negotiation then it will respond accordingly. If not, then the answering modem will not respond and the originating modem will select the default options. The initiation of feature negotiations begins upon completion of the standard handshaking sequences and must be completed before the negotiation timeout period has expired. If not completed before the negotiation timeout period has expired then the default options are automatically used. Also, in the preferred embodiment, this negotiation process is only concerned with features which affect synchronous operation since new non-synchronous features may be negotiated using existing feature negotiation processes, as described in International Organization for Standardization (ISO) Standard 8885.

Assume that the answering modem is idle 40 and that the originating modem seizes 30 the telephone line and dials the number of the answering modem. The originating modem then goes into the wait state 31. The answering modem will detect 41 the ringing signal on the telephone line and then seize 42 the telephone line. The answering modem then places 43 a 2100 Hertz answer tone on the line. The originating modem then detects 32 the answer tone. The originating modem then places 33 the origination tone on the telephone line. The answering modem detects 44 the origination tone. The originating modem and the answering modem then proceed to execute 34, 45, standard handshaking protocols, such as those described in CCITT V.22 bis and V.25, and the half-duplex handshake protocol described in U.S. patent application Ser. No. 054,419. Once these handshaking protocols have been completed both modems start their negotiation period timers and the originating modem initiates 35 the feature negotiation by sending a message, such as a list of the desired features, to the answering modem. The answering modem, in response to receiving 46 the message, will enter into the feature negotiation phase. The originating modem and the answering modem then complete 36, 47 the feature negotiation and, after the negotiation period time out, are available for data transfer. In the preferred embodiment, the features are negotiated through the exchange of SDLC-type frames. The negotiation must be completed prior to the negotiation period time out. If not, the default options are selected.

Note that the originating modem does not, at the time of initiating feature negotiation, know whether the answering modem is capable of feature negotiation or not. If the answering modem responds, then it is presumed to be capable of feature negotiation. Similarly, the answering modem knows that the originating modem is capable of feature negotiation only if the originating modem sends a list of features.

The answering modem will only engage in feature negotiation if the answering modem has been configured for synchronous operation, the answering modem has the capability to operate half duplex at 4800 or 9600 bps, at least one new (non-default) feature is supported and available, and the originating modem has initiated the feature negotiation. The originating modem will initiate the feature negotiation by sending a list of desired features only if the originating modem has been configured for synchronous operation, the originating modem has the capability to operate half-duplex at 4800 or 9600 bps, and at least one new (non-default) feature is supported and available. At the end of the negotiation time-out period the modems will go into the online (data transfer) mode of operation. Therefore, negotiation must be completed by the time that the negotiation time-out period expires. If negotiation is not completed by that time then the default features are selected. In the preferred embodiment, the negotiation time-out period is set to five seconds. In the preferred embodiment, the modems will allow one second for the negotiation time-out period unless the user has programed in a larger time-out period. In an alternative embodiment, if the user sets a negotiation time-out period of less than one second then the modem will neither initiate nor respond to feature negotiations.

The negotiation time-out period is programmed by the user while the modem is in the asynchronous command mode of operation. Also, the availability or non-availability of a particular feature may be programmed by the user while the modem is in the asychronous command mode of operation. Therefore, even if a feature is supported by the modem a user may, if desired, designate the feature as not available. The programming of modem parameters by the user is now well known to those skilled in the art. For example, see U.S. Pat. Nos. 4,700,358 and 4,742,482, both of which are assigned to the assignee of the present invention.

Although, in the preferred embodiment, feature negotiation will only be conducted if the modem has 4800 or 9600 bps half duplex capability, this is merely a design choice and is not a limiting factor. This feature negotiation could also be used by, for example, a 1200 or 2400 bps full duplex modem. However, it will be appreciated that the lower the bit rate then the longer the negotiation time-out period must be in order to allow the modems time for feature negotiation before going online.

FIG. 3 is an illustration of the preferred embodiment of the features negotiation protocol. Since half-duplex communications are being used, each modem prefaces each transmission with a fixed duration retraining sequence 66. In the preferred embodiment, if negotiation is occurring at 4800 bps, the retraining sequence sent by the transmitting modem will be 300 milliseconds of phase encoded scrambled binary 1's, using a 4 point constellation. The receiving modem will look for the retraining sequence for 280 milliseconds before switching from the retraining mode to the data transfer mode. At 9600 bps, the transmitting modem will send 50 milliseconds of phase encoded unscrambled binary 1's using a 4 point constellation, followed by 100 milliseconds of phase encoded scrambled binary 1's using a 4 point constellation, followed by 150 milliseconds of phase encoded scrambled 1's using a 32 point constellation. The receiving modem will look for the 4 point constellation, whether scrambled or unscrambled, for 100 milliseconds and then look for the 32 point constellation for 180 milliseconds before switching from the retraining mode to the data transfer mode. The originator will send one or more flags 60A, followed by the code 02 (hex), which corresponds to the "features" heading, followed by a series of N bytes 63A-63N, which lists the particular features desired, followed by two byte frame check sequence (FCS) 64, and one or more closing flags 60B. Typically, the list will specify all of the features that the originating modem supports, unless some features have been deselected by the user. Flags 60A and 60B are the HDLC/SDLC flags 01111110. In case 1, all the features requested by the originating modem are supported by the answering modem so the answering modem will respond with opening flags 60A, then code 00(hex) which corresponds to the "end" word 62, followed by the FCS 64 and closing flags 60B.

In case 2, the answering modem does not support all of the features requested by the originating modem. Therefore, the answering modem responds with opening flags 60A, followed by the code 02(hex), which corresponds to the "features" word 61, followed by N bytes 63A-63N, which lists the features requested by the originating modem that appear to be supported by the answering modem, followed by the FCS 64 and the closing flags 60B. The exchange of FEATURES messages continues until the modem receiving the message supports all of the features specified. Assuming that it is the originating modem, the originating modem then responds with an END message: the opening flags 60A, the code 00 (hex) which corresponds to the "end" word 62, followed by the FCS 64 and the closing flags 60B.

Note that, in the preferred embodiment, the originating modem is the one which initiates the negotiations by sending a list of desired features. However, it will be appreciated that this is merely a matter of design choice and that the answering modem could have been selected to initiate the negotiation.

Information concerning the selection or nonselection of a feature is always associated with a particular byte. For example, the lower 4 bits of the first byte 63A will always relate to an adjustable retraining sequence duration. The higher 4 bits of the first byte 63A may then, for example, be concerned with selection of a data compression scheme, and the second byte 63B may be concerned with a data encryption scheme. Therefore, if the features associated with a particular numbered byte are not selected then that byte would be represented by 00(hex). Using the above example, if data compression and adjustable start-up durations were not selected then the first byte 63A would have a value of 00(hex). Therefore, the selection or non-selection of a particular feature can be ascertained by simply looking at the byte which corresponds to that particular feature.

After a modem receives an END message, it responds with an IDLE message. Also, after a modem receives an IDLE message, it responds with an IDLE message. This exchange of IDLE's continues until the negotiation period time out has occurred. The intent of exchanging idles is to maintain synchronization between the modems so that, at the end of the negotiation period time out, the retraining sequence required to achieve resynchronization will be short since only short messages have been exchanged. The exchange of idle messages is not necessary for the feature negotiation but, as stated above, assists in maintaining synchronization between the clocks in the two modems. In the preferred embodiment, an IDLE message comprises one or more opening flags 60A, the IDLE 65 character 03 (hex), the FCS 64, and one or more closing flags 60B. In an alternative embodiment, both modems switch to the online mode immediately after receiving an "end" signal or an "idle" signal instead of waiting for the negotiation period timeout.

The exchanges shown in FIG. 3 are also representative of typical data transfers in that there is a retraining sequence 66, one or more opening flags 60A, data bytes (such as bytes 61, 62, 63A-63N, and 65), a frame check sequence 64, and one or more closing flags 60B. The primary difference is that, during negotiation, the retraining sequence 66 has a fixed duration whereas, if the adjustable startup duration has been selected, during online data transfer the retraining sequence 66 will have a varying duration, as shown in Tables 1 and 2.

FIG. 4 is an illustration of a typical features byte 63A. There are 8 bits B0-B7, designated as 63A0-63A7, respectively. Bits B0-B7 designate the selection or non-selection of individual features, with one bit per feature. For example, if bit B0 is a logic 1, the feature 1A will be selected; if a logic 0, then feature 1A will not be selected. Other features are similarly selected (logic 1) or non-selected (logic 0) by bits B1-B7. Also, groups of bits may be designated to select certain features and/or subfeatures of a feature. For example, bits B0 through B3 may be dedicated to the selection or non-selection of a single feature and the subfeatures thereof. In the preferred embodiment, the lower 4 bits, B0-B3, of the first word 63A1 are used to designate the selection or non-selection of the adjustable retraining sequence duration feature. If these 4 bits have a hex value of 0 then this feature is non-selected. If these bits have a hex value of 1, then the adjustable retraining sequence durations specified in Tables 1 and 2 are selected. Other hex values for these bits are reserved for future use, such as for selecting different adjustable retraining sequence duration tables.

Other hex values for these bits or for other bits also could be used, for example, for selecting different maximum block sizes and corresponding fixed duration retraining sequences.

Table 3 is a state transition table for the negotiation protocol. There are three states: wait for features; wait for "end"; and wait for "negotiation period time-out". The device remains in a state until the occurrence of one of seven events: the device receives a "end" signal; the device receives a listing of desired features, all of which are supported by that device; the device receives a listing of desired features, not all of which are supported by the device; the device receives an "idle" signal; the "no reply time-out" period has expired; the "negotiation period time-out" has expired; or the device has received a garbled signal, a signal not in the proper format, or some other transmission which begins with something other than "features", "end" or "idle", all of these receptions being collectively designated as "trash". In the preferred embodiment, the "no reply time-out" period is 950 milliseconds. The originating modem initially transmits the list of desired features and then begins in state 2. However, the answering modem begins in state 1. The originating modem always transmits the feature message, even if the default features have been selected by the user, as long as the user has not disabled all of the non-default features. This allows the answering modem to select whether the default options are to be used or whether negotiations are to be conducted. In the preferred embodiment, no new feature, whether supported or not, whether agreed upon or not, may be used during the negotiation or at any time prior to the negotiation period time-out.

Referring to Table 3, assume that the answering modem is in state 1, and receives a list of features, not all of which are supported by the answering modem. The answering modem will then transmit a list of common features and go to state 2 where it will wait for the "end" signal. The originating modem, having sent a list of features, will be in state 2 and, upon receiving the list of common features, all of which are supported, will transmit the signal "end", and go to state 3 where it will wait for the negotiation period time-out. The answering modem, being in state 2, is waiting for the "end" signal from the originating modem and, when received, goes to state 3 where it transmits the "idle" signal and waits for the negotiation period time out. The originating modem, in response to the "idle" signal, will also transmit the "idle" signal and will remain in state 3 until the negotiation period time out occurs. Both modems will continue exchanging "idle" signals in state 3 until the negotiation period time out has occurred. Once the negotiation period time-out has occurred, both the originating modem and the answering modem will use the agreed features and exit to the online mode.

In the preferred embodiment, the reply time out period is equal to two transmission delays plus the retraining sequence duration plus 100 milliseconds for a safety margin. Assuming that the maximum transmission line delay is 600 milliseconds (satellite delay), then the maximum time reply time-out value will be 1600 milliseconds.

TABLE 3

NEGOTIATION PROTOCOL STATE TRANSITION TABLE

| | EVENT | | | | | | |
|---|---|---|---|---|---|---|---|
| STATE | RECEIVE "END" | RECEIVE FEATURES, ALL ARE SUPPORTED | RECEIVE FEATURES, NOT ALL SUPPORTED | "NO REPLY TIMEOUT" | "NEGOTIATION PERIOD TIMEOUT" | RECEIVE TRASH | RECEIVE IDLE |
| 1. Wait For Features | Remain in State 1 | Transmit "End", Go To State 3 | Transmit Common Features, Go To State 2 | Remain in State 1 | Use Default Features, Exit | Remain in State 1 | Remain in State 1 |
| 2. Wait For "End" | Transmit Idle, Go To State 3 | Transmit "End", Go To State 3 | Transmit Common Features, Remain in State 2 | Repeat Last Transmission, Remain in State 2 | Use Default Features, Exit | Repeat Last Transmission, Remain in State 2 | Repeat Last Transmission Remain in State 2 |
| 3. Wait For "Negotiation Period | Transmit Features, Go To State 2 | Transmit "End", Remain in State 3 | Transmit Common Features, Go To State 2 | Remain in State 3 | Use Agreed Features, Exit | Remain in State 3 | Transmit Idle, Remain in State 3 |

TABLE 3-continued

NEGOTIATION PROTOCOL STATE TRANSITION TABLE

| STATE | RECEIVE "END" | RECEIVE FEATURES, ALL ARE SUPPORTED | RECEIVE FEATURES, NOT ALL SUPPORTED | "NO REPLY TIMEOUT" | "NEGOTIATION PERIOD TIMEOUT" | RECEIVE TRASH | RECEIVE IDLE |
|---|---|---|---|---|---|---|---|
| Timeout" | | | | | | | |

NOTES:
1. Originator transmits features and begins in State 2.
2. Answerer begins in State 1.
3. During negotiation, no new feature (e.g., adjustable duration retraining sequence) may be used.

Table 4 is a listing of three exemplary feature negotiations. Case 1 is a case where the originating modem transmissions are not properly received by the answering modem or where the answering modem is not capable of feature negotiation. Case 2 is a case wherein the desired features listed by the originating modem are all supported by the answering modem. Case 3 is a case where the desired features listed by the originating modem are not all supported by the answering modem.

TABLE 4

EXEMPLARY FEATURE NEGOTIATIONS

| CASE# | ORIGINATOR | ANSWERER |
|---|---|---|
| 1 | Transmit: Features | Receive: Garbled/No Message |
| | No Reply Timeout | |
| | Transmit: Features | Receive: Garbled/No Message |
| | Negotiation Period Timeout | Negotiation Period Timeout |
| | Use Default Features | Use Default Features |
| 2 | Transmit: Features | Receive: Features, All Supported |
| | Receive: "End" | Transmit: "End" |
| | Exchange "Idle" signals | Exchange "Idle" signals |
| | Negotiation Period Timeout | Negotiation Period Timeout |
| | Use Features | Use Features |
| 3 | Transmit: Features | Receive: Features, Not All Supported |
| | Receive: Common Features | Transmit: Common Features |
| | Transmit: "End" | Receive: "End" |
| | Exchange "Idle" signals | Exchange "Idle" signals |
| | Negotiation Period Timeout | Negotiation Period Timeout |
| | Use Agreed (Common) Features | Use Agreed (Common) Features |

Figure 5:
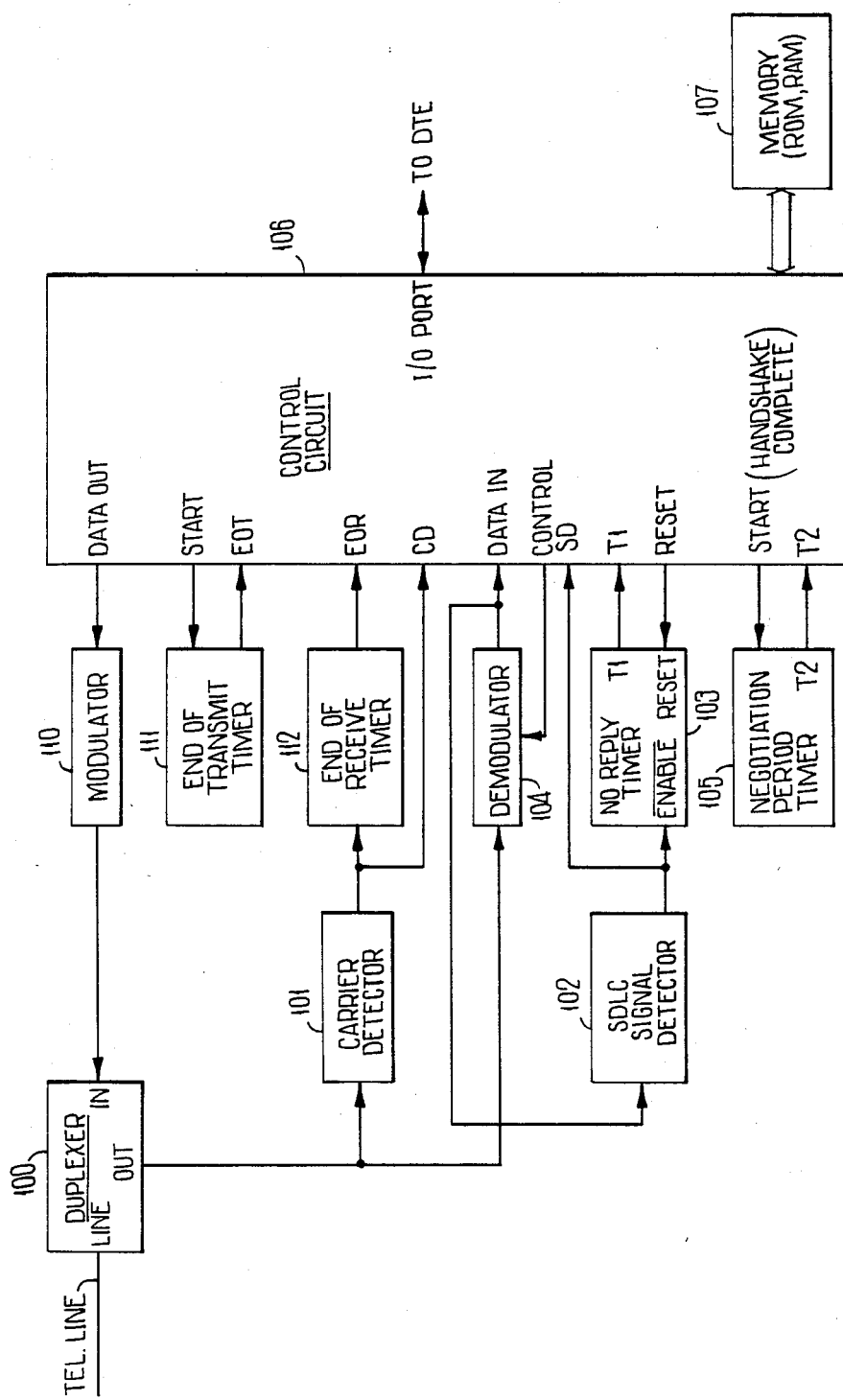
FIG. 5 is a block diagram of the preferred embodiment of the present invention.

Turn now to FIG. 5 which is a block diagram of the preferred embodiment of the present invention. FIG. 5 depicts a modem such as modem 12 or 21. A telephone line, such as line 13 or line 20, is connected to the LINE input of a duplexer 100. The output of duplexer 100 is connected to a carrier detector circuit 101 and a demodulator 104. It will be appreciated that demodulator 104 contains such circuits as a sampler, equalizer, baud clock recovery circuit, and data recovery circuit. The output of carrier detector 101 is connected to an end of receive timer 112 and the carrier detect (CD) input of control circuit 106. The output of demodulator 104 is connected to the DATA IN input of control circuit 106 and the input of SDLC signal detector 102. The output of signal detector 102 is connected to the signal detector (SD) input of control circuit 106 and the negated ENABLE input of a no reply timer 103. The output (T1) of timer 103 is connected to the T1 input of control circuit 106. The HANDSHAKE COMPLETE output of control circuit 106 is connected to the start input of a negotiation period timer 105. Timer 105 is started at the end of step 34 (45) of FIG. 2. The output (T2) of timer 105 is connected to the T2 input of control circuit 106. The I/O PORT of control circuit 106 is connected to the DTE, such as DTE 11 or 22 of FIG. 1. Control circuit 106 is also connected to a memory 107 which typically comprises both a ROM and a RAM. Memory 107 contains a list of features which are supported and available (have not been disabled by the user) as well as a list of features that the user has selected as preferred features to be implemented. The DATA OUT output of control circuit 106 is connected to modulator 108. The output of modulator 108 is connected to the input (IN) of duplexer 100. Although shown as separate functional blocks for convenience and clarity, in the preferred embodiment components 101 through 108 are partially or completely implemented by one or more microprocessors and supporting memories. Also, in the preferred embodiment, the retraining sequence duration tables are stored in memory 107.

If feature negotiation is undertaken then, at the end of each feature negotiation transmission, control circuit 106 will reset no reply timer 103. If the other modem does not answer, then the output of signal detector 102 will be low and timer 103 will be enabled. If the other modem still does not reply then, at the end of the no reply time-out period, output T1 will go high and advise control circuit 106 that the no reply period has expired. However, if the other modem answers before this period has expired, then the output of signal detector 102 will go high, thereby disabling timer 103. After conventional handshaking has been completed, and as or before the feature negotiation begins, control circuit 106 will start negotiation period timer 105. At the end of the negotiation period (T2) timer 105 will advise control circuit 106 that the negotiation period has expired.

An end of transmit timer 111 and an end of receiver timer 112 provide a measurement to control circuit 106 of the amount of elapsed time since the end of the last transmission and the end of the last reception, respectively. The timers provide control circuit 106 with the information needed for the proper execution of the adjustable retraining sequence duration protocols previously described. Timer 111 is reset and started by control circuit 106 at the end of each transmission. Control circuit 106 reads the elapsed time from timer 111 just prior to beginning a transmission. Carrier detector 101 provides a carrier detect signal whenever an incoming carrier is received. Timer 112 is reset and started whenever carrier detector 101 does not detect a carrier from the other modem. Control circuit 106 reads the elapsed time from timer 112 when the beginning of a transmission from the other modem is detected (CD input becomes active).

The present invention therefore offers the following advantages: a feature negotiation protocol which is compatible with existing modems; a feature negotiation protocol which provides for essentially unlimited future expansion; a feature negotiation protocol which is useful in synchronous operation; and a retraining sequence which has a variable duration and therefore improves the effective data transfer rate (data throughput) of the system.

From the above, other embodiments of and modifications to the present invention will suggest themselves to those skilled in the art. Therefore, the scope of the present invention is to be limited only by the claims below.

We claim:

1. In half-duplex communications between a first modem and a second modem, a method of operating said first modem, comprising the steps of:
    establishing communications with said second modem;
    negotiating with said second modem to select a table of retraining sequence durations, each retraining sequence duration of said retraining sequence durations being for a predetermined range of values for a period of non-transmission, said table being one of a plurality of tables contained in a memory;
    obtaining a measurement of each said period of non-transmission;
    obtaining from said table which was selected a value for said retraining sequence duration corresponding to said measurement;
    providing to said second modem a retraining sequence for said retraining sequence duration; and
    transmitting data to said second modem.

2. The method of claim 1 wherein said retraining sequence comprises a series of scrambled logic 1's for said duration.

3. The method of claim 1 wherein said retraining sequence comprises:
    a first series of scrambled 1's using a first constellation for a first predetermined portion of said duration; and
    a second series of scrambled 1's using a second constellation for a second predetermined portion of said duration.

4. The method of claim 3 wherein said first constellation is a 4 point constellation and said second constellation is a 32 point constellation.

5. The method of claim 1 wherein said retraining sequence comprises:
    a first series of unscrambled 1's using a first constellation for a first predetermined portion of said duration;
    a second series of scrambled 1's using said first constellation for a second predetermined portion of said duration; and
    a third series of scrambled 1's using a second constellation for a third predetermined portion of said duration.

6. The method claim 5 wherein said first constellation is a 4 point constellation and said second constellation is a 32 point constellation.

7. In half-duplex communications between a first modem and a second modem, a method of operating said second modem, comprising the steps of:
    establishing communications with said first modem;
    negotiating with said first modem to select a table of retraining sequence durations, each retraining sequence duration of said retraining sequence durations being for a predetermined range of values for a period of non-reception, said table being one of a plurality of tables contained in a memory;
    obtaining a measurement of each said period of non-reception;
    obtaining from said table which was selected a value for said retraining sequence duration corresponding to said measurement;
    entering a resynchronization mode;
    using a signal from said first modem for said retraining sequence duration to effect resynchronization after said period of non-reception; and
    entering a data transfer mode.

8. The method of claim 7 wherein said step of using said signal comprises:
    using a first predetermined portion of said signal to obtain a coarse resynchronization; and
    using a second predetermined portion of said signal to obtain a fine resynchronization.

9. In half-duplex communications between a first modem and a second modem, a method of operating said modems to improve resynchronization of a receiver in said second modem to a transmitter in said first modem after a period during which said transmitter of said first modem has not sent a signal to said receiver of said second modem, comprising:
    a first modem procedure comprising the steps of:
        obtaining a first measurement of said period;
        determining a first duration dependent upon said first measurement;
        providing to said second modem a retraining sequence for said first duration; and
        sending data to said second modem; and
    a second modem procedure comprising the steps of:
        obtaining a second measurement of said period;
        determining a second duration dependent upon said second measurement, said second duration being less than said first duration when said second measurement is not greater than said first measurement;
        operating in a resynchronization mode for said second duration and using said retraining sequence from said first modem to effect said resynchronization; and
        operating in an online mode.

10. The method of claim 9 wherein said retraining sequence comprises a series of scrambled logic 1's for said first duration.

11. The method of claim 9 wherein said retraining sequence comprises:
    a first series of scrmbled 1's using a first constellation for a first predetermined portion of said first duration; and
    a second series of scrambled 1's using a second constellation for a second predetermined portion of said first duration.

12. The method of claim 11 wherein said first constellation is a 4 point constellation and said second constellation is a 32 point constellation.

13. The method of claim 9 wherein said retraining sequence comprises:
    a first series of scrambled 1's using a first constellation for a first predetermined portion of said first duration;
    a second series of scrambled 1's using said first constellation for a second predetermined portion of said first duration; and a third series of scrambled 1's using a second constellation for a third predetermined portion of said first duration.

14. The method of claim 13 wherein said first constellation is a 4 point constellation and said second constellation is a 32 point constellation.

15. The method of claim 9 wherein said step of determining said first duration comprises:
  entering a look-up table in memory in said first modem; and
  obtaining from said look-up table a value for said first duration.

16. The method of claim 9 wherein said step of determining said second duration comprises:
  entering a look-up table in memory in said second modem; and
  obtaining from said look-up table a value for said second duration.

17. The method of claim 9 wherein said step of operating in said resynchronization mode comprises:
  using a first predetermined portion of said retraining sequence to obtain a coarse resynchronization; and
  using a second predetermined portion of said retraining sequence to obtain a fine resynchronization.

18. The method of claim 17 wherein said first predetermined portion of said retraining sequence comprises a first constellation and said second predetermined portion of said retraining sequence comprises a second constellation.

19. The method of claim 17 wherein said first constellation is a 4 point constellation and said second constellation is a 32 point constellation.

20. An improved half-duplex modem, comprising:
  a modem transmitter comprising:
    first means for measuring a first elapsed time since a preceding signal transmission;
    second means responsive to said first elapsed time for determining a transmitted retraining sequence duration; and
    third means responsive to said retraining sequence duration for generating a retraining sequence; and
  a modem receiver comprising:
    fourth means for measuring a second elapsed time since a preceding signal reception;
    fifth means responsive to said second elapsed time for determining a received retraining sequence duration, said received retraining sequence duration being less than said transmitted retraining sequence duration when said second elapsed time is not greater than said first elapsed time; and
    sixth means for effecting resynchronization of said receiver during said received retraining sequence duration by using a received retraining sequence.

21. The improved half-duplex modem of claim 20 wherein said second means comprises a look-up table.

22. The improved half-duplex modem of claim 20 wherein said second means determines a first partial duration and a second partial duration, the sum of said first partial duration and said second partial duration being equal to said transmitted retraining sequence duration.

23. The improved half-duplex modem of claim 22 wherein said third means generates a first retraining sequence for said first partial duration and a second retraining sequence for said second partial duration.

24. The improved half-duplex modem of claim 23 wherein said first retraining sequence comprises a first series of logical 1's using a first constellation and a second series of logical 1's using a second constellation.

25. The improved half-duplex modem of claim 24 wherein said first constellation is a 4 point constellation and said second constellation is a 32 point constellation.

26. The improved half-duplex modem of claim 20 wherein said fifth means comprises a look-up table.

27. The improved half-duplex modem of claim 20 wherein said fifth means determines a first partial duration and a second partial duration, the sum of said first partial duration and said second partial duration being equal to said received retraining sequence duration.

28. The improved half-duplex modem of claim 27 wherein said sixth means uses said received retraining sequence received during said first partial duration to effect a coarse resynchronization and uses said received retraining sequence received during said second partial duration to effect a fine resynchronization.

29. The improved half-duplex modem of claim 20 and further comprising:
  means for switching to an on-line mode of operation after sending said transmitted retraining sequence.

30. The improved half-duplex modem of claim 20 and further comprising:
  means for switching to an on-line mode of operation after receiving said received retraining sequence for said received retraining sequence duration.

31. The improved half-duplex modem of claim 20 wherein said second means comprises a plurality of look-up tables, each of said look-up tables comprising a plurality of transmitted retraining sequence duration values, each of said transmitted retraining sequence duration values being for a predetermined range of values for said first elapsed time.

32. The improved half-duplex modem of claim 31 and further comprising:
  means for communicating with a connected modem and determining which look-up table of said plurality of look-up tables will be used in conjunction with data transfers.

33. The improved half-duplex modem of claim 20 wherein said fifth means comprises a plurality of look-up tables, each of said look-up tables comprising a plurality of received retraining sequence duration values, each of said received retraining sequence duration values being for a predetermined range of values for said second elapsed time.

34. The improved half-duplex modem of claim 33 and further comprising:
  means for communicating with a connected modem and determining which look-up table of said plurality of look-up tables will be used in conjunction with data transfers.

35. In half-duplex communications between a first modem and a second modem, a method of operating said modems, comprising:
  a first modem procedure comprising the steps of:
    establishing communications with said second modem;
    negotiating with said second modem to select a table of transmitted retraining sequence duration values, each of said transmitted retraining sequence duration values being for a predetermined range of values for a first elapsed time, said table being one of a plurality of tables contained in a memory;

obtaining a value for said first elapsed time, said first elapsed time being measured from termination of a preceding transmission;

obtaining from said table which was selected a value for said transmitted retraining sequence duration corresponding to said value for said first elapsed time;

transmitting a retraining sequence for said transmitted retraining sequence duration; and transmitting data to said second modem; and a second modem procedure comprising the steps of:

establishing communications with said first modem;

negotiating with said first modem to select a table of received retraining sequence duration values, each of said received retraining sequence duration values being for a predetermined range of values for a second elapsed time, said table being one of a plurality of tables contained in said memory;

obtaining a value for said second elapsed time, said second elapsed time being measured from termination of a preceding reception;

obtaining from said table which was selected a value for said received retraining sequence duration corresponding to said value for said second elapsed time;

entering a resynchronization mode;

retraining circuits in said second modem for a period at least equal to said value for said received retraining sequence duration; and entering a data transfer mode.

36. The method of claim 35 wherein said received retraining sequence duration is less than said transmitted retraining sequence duration when said second elapsed time is not greater than said first elapsed time.

37. The method of claim 35 wherein said transmitted retraining sequence comprises a series of scrambled logic 1's for said transmitted retraining sequence duration.

38. The method of claim 35 wherein said transmitted retraining sequence comprises:

a first series of scrambled 1's using a first constellation for a first predetermined portion of said transmitted retraining sequence duration; and a second series of scrambled 1's using a second constellation for a second predetermined portion of said transmitted retraining sequence duration.

39. The method of claim 38 wherein said first constellation is a 4 point constellation and said second constellation is a 32 point constellation.

40. The method of claim 35 wherein said transmitted retraining sequence comprises:

a first series of unscrambled 1's using a first constellation for a first predetermined portion of said transmitted retraining sequence duration;

a second series of scrambled 1's using said first constellation for a second predetermined portion of said transmitted retraining sequence duration; and a third series of scrambled 1's using a second constellation for a third predetermined portion of said transmitted retraining sequence duration.

41. The method of claim 40 wherein said first constellation is a 4 point constellation and said second constellation is a 32 point constellation.

42. The method of claim 35 wherein said step of retraining circuits comprises:

using a first predetermined portion of a received retraining sequence to obtain a coarse resynchronization; and using a second predetermined portion of said received retraining sequence to obtain a fine resynchronization.

43. The method of claim 42 wherein said second modem determines said first predetermined duration and said second predetermined duration from said measurement of said second elapsed time.

* * * * *